(12) United States Patent
Goslin et al.

(10) Patent No.: US 12,015,612 B2
(45) Date of Patent: Jun. 18, 2024

(54) TECHNIQUES FOR COMMUNICATING VIA EXCHANGES OF PHYSICAL CHARMS

(71) Applicant: Disney Enterprises, Inc., Burbank, CA (US)

(72) Inventors: Michael Goslin, Sherman Oaks, CA (US); Larra Paolilli, Glendale, CA (US); Katherine M. Bassett, Pasadena, CA (US); Janice Rosenthal, Pasadena, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 340 days.

(21) Appl. No.: 15/687,391

(22) Filed: Aug. 25, 2017

(65) Prior Publication Data
US 2019/0068603 A1  Feb. 28, 2019

(51) Int. Cl.
*H04L 9/40* (2022.01)
*G06F 16/00* (2019.01)
(Continued)

(52) U.S. Cl.
CPC ............ *H04L 63/101* (2013.01); *G06F 16/00* (2019.01); *G06F 16/90335* (2019.01);
(Continued)

(58) Field of Classification Search
CPC ... H04L 63/101; H04L 51/12; G06F 21/6209; G06F 16/90335; G06F 16/00; G06F 21/34
See application file for complete search history.

(56) References Cited

U.S. PATENT DOCUMENTS

| | | | |
|---|---|---|---|
| 2004/0205161 A1* | 10/2004 | Hamilton, II | H04L 51/04 709/219 |
| 2006/0041746 A1* | 2/2006 | Kirkup | G06F 21/34 713/168 |

(Continued)

OTHER PUBLICATIONS

Greyce et al., "Digtial Twin Data Modeling with AutomationML and a Communication Methodology for Data Exchange," 2016, pp. 1-17 (Year: 2017).*

(Continued)

*Primary Examiner* — Luu T Pham
*Assistant Examiner* — Canh Le
(74) *Attorney, Agent, or Firm* — Artegis Law Group, LLP

(57) ABSTRACT

In one embodiment, a charm application enables user devices to communicate via physical charms. Upon receiving, from a first user device, a read request that is associated with the physical charm, the charm application identifies a message and an authorization list that are associated with the physical charm and previously received from a second user device. The charm application then determines whether a first user associated with the first user device is authorized to read the message based on the authorization list. If the first user is authorized to read the message, then the charm application transmits the message to the first user device. Notably, each physical charm may be exchanged between any number of users, but only read by authorized users via a user device. Accordingly, user devices may communicate private messages including any type of data with other user devices irrespective of whether technical infrastructures are accessible.

15 Claims, 4 Drawing Sheets

(51) Int. Cl.
  *G06F 16/903* (2019.01)
  *G06F 21/34* (2013.01)
  *G06F 21/62* (2013.01)
  *H04L 51/212* (2022.01)
  *H04L 67/10* (2022.01)
  *H04L 67/12* (2022.01)

(52) U.S. Cl.
  CPC .......... *G06F 21/34* (2013.01); *G06F 21/6209* (2013.01); *H04L 51/212* (2022.05); *H04L 67/10* (2013.01); *H04L 67/12* (2013.01)

(56) References Cited

U.S. PATENT DOCUMENTS

| | | | | |
|---|---|---|---|---|
| 2009/0164928 | A1* | 6/2009 | Brown | G06F 3/0482 715/767 |
| 2009/0265278 | A1* | 10/2009 | Wang | H04L 63/0428 705/54 |
| 2010/0207721 | A1* | 8/2010 | Nakajima | H04W 12/1206 340/5.3 |
| 2013/0173658 | A1* | 7/2013 | Adelman | G06Q 50/01 707/769 |
| 2014/0064735 | A1* | 3/2014 | Thompson | H04M 1/72415 340/12.23 |
| 2015/0222617 | A1* | 8/2015 | Ebersman | H04L 51/12 726/4 |
| 2016/0080385 | A1* | 3/2016 | Lewis | H04L 63/101 726/6 |
| 2016/0323271 | A1* | 11/2016 | Hinman | H04W 4/21 |
| 2016/0335423 | A1* | 11/2016 | Beals | H04L 12/2825 |
| 2016/0345171 | A1* | 11/2016 | Kulkarni | H04M 3/42042 |
| 2017/0358010 | A1* | 12/2017 | Montaque | G06Q 30/0275 |
| 2018/0310046 | A1* | 10/2018 | Cullen | H04L 12/06 |
| 2018/0350211 | A1* | 12/2018 | Jenkins | G08B 21/0233 |

OTHER PUBLICATIONS

Kawanai et al., "Charmonium potential from full lattice QCD," 2012, pp. 1-6. (Year: 2016).*

* cited by examiner

TECHNIQUES FOR COMMUNICATING VIA EXCHANGES OF PHYSICAL CHARMS

BACKGROUND OF THE INVENTION

Field of the Invention

Embodiments of the present invention relate generally to communications technology and, more specifically, to techniques for communicating via exchanges of physical charms.

Description of the Related Art

Many people rely on technical infrastructures to discreetly communicate information to specific persons or groups of persons, where that information can be consumed by the recipients immediately or at a later time that is more convenient for the recipients. For example, many people use cellular networks to send text messages to personal and work acquaintances. In another example, many people use the Internet to send email to personal and work acquaintances.

One limitation of communicating via a technical infrastructure is that the technical infrastructure may not always be available or accessible. For example, some schools prohibit students from using cell phones during school hours. In another example, cellular networks and the Internet are not always available in remote locations, such as the more remote regions of some national parks.

When technical infrastructures are unavailable or inaccessible, privately communicating information with a specific person or group of people becomes challenging. In particular, techniques for communicating without a technical infrastructure typically suffer limitations related to content and/or privacy. For example, if a writing instrument is available, then a person could write a message on a piece of paper, and pass the piece of paper to another person via a chain of intermediaries. However, communicating non-written data (e.g., audio data, video data, etc.) using a piece of paper is not possible, and any of the intermediaries could read the message while handling the piece of paper.

As the foregoing illustrates, what is needed in the art are more effective techniques for communicating with other persons when disconnected from a technical infrastructure.

SUMMARY OF THE INVENTION

One embodiment of the present invention sets forth a computer-implemented method for communicating via a physical charm. The method includes receiving, from a first user device associated with a first user, a first read request associated with a first physical charm; in response to receiving the first read request, identifying a message and an authorization list that are associated with the first physical charm and previously received from a second user device; determining that the first user is authorized to read the message based on the authorization list; and transmitting the message to the first user device.

One advantage of the disclosed techniques is that a charm application that implements the techniques enables user devices to discreetly communicate a wide variety of information with other user devices when a technical infrastructure is unavailable. More specifically, the charm application enables a user device to associate a message and an authorization list with a physical charm. As the physical charm is passed among any number of persons, the charm application enables any user device associated with a person included in the authorization list to receive the message.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
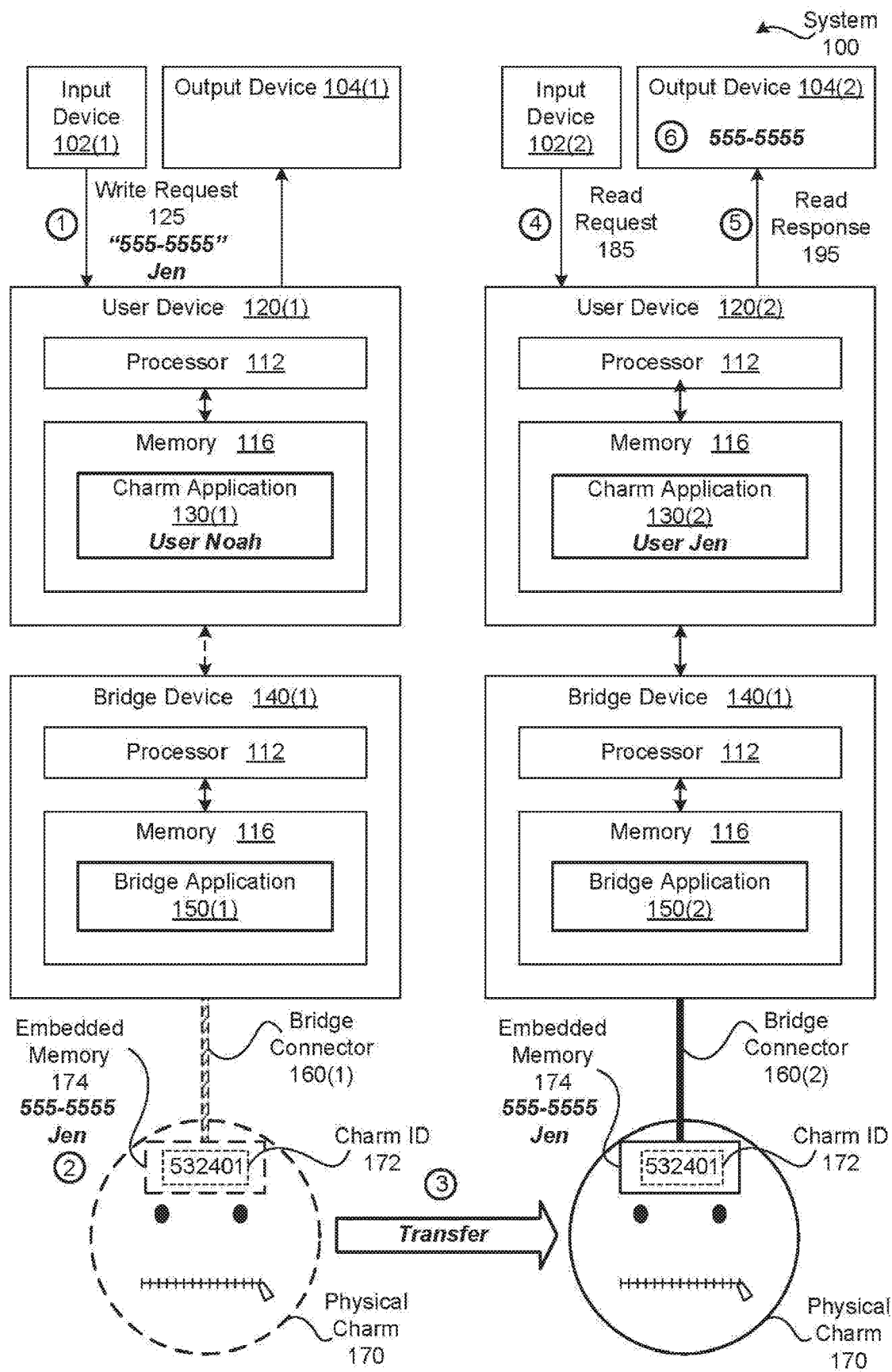
FIG. 1 is a conceptual illustration of a system configured to implement one or more aspects of the present invention.

FIG. 1 is a conceptual illustration of a system 100 configured to implement one or more aspects of the present invention. As shown, the system 100 includes, without limitation, two user devices 120, two input devices 102, two output devices 104, a physical charm 170, two bridge devices 140, and two bridge connectors 160. In alternate embodiments, the system 100 may include any number of user devices 120, any number of input devices 102, any number of output devices 104, any number of bridge devices 140, any number of bridge connectors 160, and any number of physical charms 170. For explanatory purposes, multiple instances of like objects are denoted with reference numbers identifying the object and parenthetical numbers identifying the instance where needed.

Each of the user devices 120 may be any device that is capable of receiving input from users, causing software applications to execute, and providing output to users. For explanatory purposes only, each of the user devices 120 receives input from a corresponding input device 102 and provides output to a corresponding output device 104. In alternate embodiments, each of the user devices 120 may be associated with any number (including zero) of external input devices 120, output devices 104, and input/output devices (not shown), in any combination. Further, each of the user devices 120 may include any number (including zero) of integrated input devices 102, integrated output devices 104, and integrated input/output devices, in any combination.

Some examples of user devices 120 include, without limitation, desktop computers, laptops, smartphones, smart televisions, game consoles, tablets, etc. Some examples of input devices 104 include, without limitation, keyboards, mice, trackpads, microphones, and video cameras, to name a few. Some examples of output devices 104 include liquid crystal displays, light-emitting diode displays, projection displays, stereo 3D displays, headphones, speakers, and the like. One example of an input/output device is a touchscreen.

As shown, each of the user devices 120 includes, without limitation, the memory 116 and the processor 112. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112. The memory 116 may be one or more of a readily available memory, such as random access memory (RAM), read only memory (ROM), floppy disk, hard disk, or any other form of digital storage, local or remote.

In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, cloud storage, a Blu-ray Disc, other tangible storage media, or any suitable combination of the foregoing.

In alternate embodiments, the system 100 may include any number of user devices 120, any number of memories 116, and any number of processors 112 that are implemented in any technically feasible fashion. Further, the user devices 120, the memory 116, and the processor 112 may be implemented via any number of physical resources located in any number of physical locations. For example, the memory 116 and the processor 112 could be implemented in a cloud computing environment or a distributed computing environment that is accessible to the user device 120. The connection topology between the various units in FIG. 1 may be modified as desired.

In general, the system 100 enables users to discreetly communicate with other users. Many conventional systems that enable users to discreetly communicate with other users use a technical infrastructure, such as a cellular network or the Internet. One limitation of communicating via a technical infrastructure is that the technical infrastructure may not always be available or accessible. For example, some schools prohibit students from using cell phones during school hours. In another example, cellular networks and the Internet are not always available in remote locations, such as the more remote regions of some national parks.

When technical infrastructures are unavailable or inaccessible, privately communicating information with a specific person or group of people becomes challenging. In particular, conventional techniques for communicating without a technical infrastructure typically suffer limitations related to content and/or privacy. For example, if a writing instrument is available, then a person could write a message on a piece of paper, and pass the piece of paper to another person via a chain of intermediaries. However, communicating non-written data (e.g., audio data, video data, etc.) using a piece of paper is not possible, and any of the intermediaries could read the message while handling the piece of paper.

Communicating via Physical Charms

To enable users to communicate private messages that include any type of data to other users irrespective of whether technical infrastructures are accessible, the system 100 includes the physical charm 170 and two instances of a charm application 130. In alternate embodiments, the system 100 may include any number of physical charms 170 and any number of instances of the charm application 130. The physical charm 170 may be any physical object with any shape that is fabricated using any material in any technically feasible fashion. Each physical charm 170 is associated with a charm identifier (ID) 172 that identifies the physical charm 170.

As shown, the physical charm 170 portrays a happy face with zippered lips (in this example, the zippered lips indicate privacy). In alternate embodiments, the physical charm 170 may be a physical emoji that indicates an emotional state (e.g., happy, sad, surprised, mad, etc.). Further, the physical charm 170 may be associated with a particular character from movies, television shows, books or other media. For instance, in alternate embodiments, the physical charm 170 may portray a character's face with tears running down the cheeks.

The physical charm 170 may be transferred between any number of users, any number of times. For instance, one user may present the physical charm 170 to another user as a birthday gift or a going away present. Further, one user may transfer the physical charm to another user via any number of intermediaries. As referred to herein, an intermediary is any user that receives the physical charm 170, but is not an intended recipient of the physical charm 170.

In general, the charm application 130 performs activities and/or generates responses related to communicating via any number of physical charms 170 based on requests from any number of users. In response to a write request 125 associated with a particular physical charm 170, the charm application 130 associates a message (not shown in FIG. 1) and an authorization list (not shown in FIG. 1) with the physical charm 170. The message may include any amount and types of data. For example, a message could include a combination of text data, graphical data, haptic data, audio data, and video data. The authorization list specifies any number of users that are permitted to retrieve the message in any technically feasible fashion. For example, the authorization list could include a list of user IDs or a list of IDs associated with the bridge devices 140. In some embodiments, the authorization list defaults to all users.

In response to a read request 185 associated with a particular physical charm 170, the charm application 130 determines whether the user that issued the read request 185 is authorized to access the message associated with the physical charm 170 based on the authorization list associated with the physical charm 170. If the user is authorized to access the message, then the charm application 130 provides the message to the user as a read response 195. The charm application 130 may provide the message in any technically feasible fashion. For example, if the message includes audio data, then the charm application 130 may configure a speaker to playback the message. If, however, the user is not authorized to access the message, then the charm application 130 provides an unsuccessful read response 195 to the user. The "unsuccessful" read response 195 indicates that the user is not permitted to access the message.

In various embodiments, the charm application 130 may respond to additional requests and/or implement additional functionality. For instance, as described in greater detail in conjunction with FIG. 2, the charm application 130 may respond to history requests and implement additional functionality to store historical data associated with the physical charms 170. In the same or other embodiments, prior to executing a write request 125 associated with a particular physical charm 170, the charm application 130 may determine whether the user that issued the write request 125 is permitted to write to the physical charm 170. For example, the physical charm 170 could be associated with a "single source mode" that allows only a single user to associate a message with the physical charm 170. In another example, the physical charm 170 could be associated with a "read only mode" that allow only a first write request 125 associated with the physical charm 170 to successfully execute.

In general, as part of receiving, processing, and responding to requests, the charm application 130 accesses memory that is associated with at least one of the physical charms 170. As described in detail in conjunction with FIG. 2, in some embodiments, the memory that is associated with at least one of the physical charms 170 comprises a charm database that is located in a centralized location accessible to multiple user devices 120. In such embodiments, the physical charms 170 do not necessarily include any electronic functionality. For example, a particular physical charm 170 could be "dumb" pieces of plastic on a surface of which the associated user ID 172 is visually apparent (e.g., stamped on the plastic).

Storing Messages in Physical Charms

As shown in FIG. 1, in other embodiments, each of the physical charms 170 includes, without limitation, an embedded memory 174. The embedded memory 174 includes, without limitation, any amount of read-write memory. The embedded memory 174 may be implemented in any technically feasibly fashion. For example, the embedded memory 174 could include any amount and combination of random access memory (RAM) and erasable programmable read-only memory (EPROM or Flash memory). In addition to read-write memory, the embedded memory 174 may include any amount of read-only memory (ROM).

To enable the charm application 130 to perform operations on the embedded memory 174, the system 100 includes the bridge devices 140 and the bridge connectors 160. At any given time, the physical charm 170 may be connected to one of the user devices 120 via one of the bridge devices 140 and one of the bridge connectors 160. As shown, the bridge device 140 includes, without limitation, the processor 112 and the memory 116. The bridge device 140 and the bridge connector 160 may be implemented in any technically feasible fashion that is compatible with the physical charm 170. In some embodiments, the bridge device 140 is a wearable device. For example, the bridge device could be a bracelet. A user could wear the bracelet and attach any number of the physical charms 170 to the bracelet.

A bridge application 150 resides in the memory 116 of the bridge device 140 and executes on the processor 112 of the bridge device 140. When the physical charm 170 is connected with the bridge device 140 via the bridge connector 160, the bridge application 150 is able to read from and write to the embedded memory 174 included in the physical charm 170. Further, upon detecting a connection to the physical charm 170, the bridge application 150 may perform any number and type of technically feasible actions based on any available information.

In particular, as part of the manufacturing process, the charm identifier (ID) 172 is stored in the embedded memory 174. When the physical charm 170 is connected with the bridge device 140, the bridge application 150 reads the charm ID 172 from the embedded memory 174. In alternate embodiments, the charm ID 172 could be encoded using discrete electronic components, such as resistors, and the bridge application 150 could determine the charm ID 172 based on measuring electrical resistances.

In some embodiments, after reading the charm ID 172 from the embedded memory 174, the bridge application 150 determines whether the charm ID 172 satisfies a predetermined criteria. If the charm ID 172 satisfies the predetermined criterion, then the bridge application 150 causes the bridge device 140 or the physical charm 170 to perform a predetermined action. For example, in some embodiments, the bridge device 140 may include light-emitting diodes. If the charm ID 172 ends in a "1," then the bridge application 150 could be configured to cause the bridge device 140 to glow blue.

In various embodiments, the bridge application 150 stores historical data associated with the physical charms 170 with which the bridge device 140 has been connected. For each connected physical charm 170, the bridge device 140 may store a timestamp, the charm ID 172, the message, and the authorization list that is stored in the embedded memory 174 of the connected physical charm 170.

Each of the bridge devices 140 may be connected with a corresponding user device 120 in any wired or wireless manner based on any technically feasible communications protocol. For example, the bridge device 140(1) could be connected with the user device 120(1) using Bluetooth or a wireless local area network. In general, when the bridge device 140 is connected to the user device 120, the charm application 130 and the bridge application 150 work together to process requests received by the charm application 130.

More specifically, the charm application 130 transmits write requests 125 to the bridge application 150. Upon receiving the write request 125, the bridge application 150 determines whether the bridge device 140 is connected to the physical charm 170 associated with the write request 125 based on the charm ID 172. If the bridge device is connected to the "associated" physical charm 170, then the bridge application 150 stores the associated message and the associated authorization list in the embedded memory 174 of the physical charm 170.

If, however, the bridge device 140 is not connected to the physical charm 170 associated with the write request 125, then the bridge application 150 stores the associated charm ID 172, the associated message, and the associated authorization list in the memory 116 of the bridge device 140. Subsequently, if the bridge device 140 is connected to the associated physical charm 170, then the bridge application 150 stores the associated message and the associated authorization list in the embedded memory 174 of the physical charm 170.

In alternate embodiments, if the bridge device 140 is not connected to the corresponding physical charm 170, then the bridge application 150 may transmit an error message to the charm application 130 and discard the write request 125. In other alternate embodiments, the bridge device 140 may disregard any charm ID 172 and store the associated message and authorization list in the embedded memory 174 of any connected physical charm 170. In such embodiments, neither the write request 125 nor the physical charm 170 is required to be associated with any charm ID 172.

Similarly, the charm application 130 transmits read requests 185 to the bridge application 150. Upon receiving the read request 185, the bridge application 150 determines whether the bridge device 140 is connected to the associated physical charm 170 based on the charm ID 172. If the bridge device 140 is connected to the associated physical charm 170, then the bridge application 150 reads the message and the authorization list from the embedded memory 174 of the physical charm 170. The bridge application 150 then transmits the message and the authorization list to the charm application 130.

If, however, the bridge device 140 is not connected to the physical charm 170 associated with the read request 185, then the bridge application 150 attempts to process the read request 185 based on the historical data stored in the memory 116 of the bridge device 140. More specifically, the bridge application 150 determines whether the historical includes the message and authorization list associated with the charm ID 172 associated with the read request 185. If the historical data includes the message and authorization list associated with the charm ID 172, then the bridge application 150 transmits the message and authorization list to the charm application 130. In this fashion, the bridge application 150 is able to provide the proper message and authorization list to the charm application 130 irrespective of whether the bridge device 140 is currently connected to the physical charm 170 associated with the read request 185.

In alternate embodiments, if the bridge device 140 is not connected to the physical charm 170 associated with the read request 185, then the bridge application 150 may transmit an error message to the charm application 130 and discard the read request 185. In other alternate embodiments, the bridge application 150 may disregard any charm ID 172 and read the message and authorization list from the embedded memory 174 of any connected physical charm 170. The bridge application 150 may then transmit the message and authorization list to the charm application 130. In such embodiments, neither the read request 185 nor the physical charm 170 is required to be associated with any charm ID 172.

In various embodiments, the bridge application 150 and the charm application 130 may include additional functionality that facilitates communicating via the charms 170. In some embodiments, upon determining that the bridge device 140 is connected to both the user device 120 and the physical charm 170, the bridge application 150 transmits the bridge ID 172 to the charm application 130. The charm application 130 may then identify the physical charm 170 to the user in any technically feasible fashion. For example, the charm application 130 could provide the charm ID 172 to the user directly. In another example, the charm application 130 could associate the charm ID 172 with a graphical depiction of the physical charm 170 via a graphical user interface (GUI).

For explanatory purposes only, FIG. 1 depicts a sequence of events involved in a communication between a user "Noah" and another user "Jen" using a series of numbered bubbles. FIG. 1 depicts an initial connection of the physical charm 170 to the user device 120(1) via the bridge device 140(1) and the bridge connector 160(1) with dotted lines. The processor 112 of the user device 120(1) is executing the instance of the charm application 130(1) associated with Noah.

First, as depicted with the bubble numbered 1, Noah enters the write request 125 via the input device 102(1) and a GUI associated with the charm application 130(1). The write request 125 specifies a message "555-5555" and a recipient list that includes a user ID associated with Jen. To associate the write request 125 with the physical charm 170, Noah selects the depiction of the physical charm 170 in the GUI. The charm application 130(1) transmits the write request 125 to the bridge application 150(1). As depicted with the bubble numbered 2, the bridge application 150(1) stores the message and the recipient list in the embedded memory 174 included in the physical charm 170.

As depicted with the bubble numbered 3, Noah disconnects the physical charm 170 from the bridge device 140(1) and transfers the physical charm 170 to Jen. As depicted with solid lines, Jen then connects the physical charm 170 to the user device 120(2) via the bridge device 140(2) and the bridge connector 160(2). The processor 112 of the user device 120(2) is executing the charm application 130(2) associated with Jen.

As depicted with the bubble numbered 4, Jen issues the read request 185 via the input device 102(2) and a GUI associated with the charm application 130(2). To associate the read request 185 with the physical charm 170, Jen selects the physical charm 170 in the GUI. The charm application 130(2) transmits the read request 185 to the bridge application 150(2). The bridge application 150(2) reads the message and the authorization list stored in the embedded memory 174 included in the physical charm 170. The bridge application 150(2) then transmits the message and the authorization list to the charm application 130(2).

As depicted with the bubble numbered 5, after verifying that the user ID associated with Jen is included in the authorization list, the charm application 130(2) provides the message to Jen as the read response 195. More precisely, since the message is in a text format, the charm application 130(2) causes the output device 104(2) to display the message "555-5555."

Advantageously, one user may transfer the physical charm 170 to another user via any number of intermediaries. The charm application 130 ensures that any of the intermediaries that are not included in the authorization list do not access the message. Consequently, the charm application 130 ensures that the privacy of the message is preserved. In various embodiments, after a user B receives the physical charm 170 directly or indirectly from a user A, user B may append a new message to the message, replace the message with a new message, or leave the message unchanged. Further, user B may modify the authorization list or leave the authorization list unchanged. Subsequently, user B may transfer the physical charm 170 directly or indirectly to a user C. In this fashion, the physical charm 170 may be transferred any number of times between any number of users.

Note that the techniques described herein are illustrative rather than restrictive, and may be altered without departing from the broader spirit and scope of the invention. Many modifications and variations on the functionality provided by the charm application 130, the bridge application 150, the bridge device 140, and the physical charm 170 will be apparent to those of ordinary skill in the art without departing from the scope and spirit of the described embodiments. For instance, in various embodiments, any number of the techniques or devices may be implemented while other techniques may be omitted or replaced in any technically feasible fashion.

It will be appreciated that the system 100 shown herein is illustrative and that variations and modifications are possible. For example the functionality of the charm application 130 and the bridge application 150 as described herein may be integrated into or distributed across any number of software applications (including one) and any number of components of the system 100. Further, the connection topology between the various units in FIG. 1 may be modified as desired. For instance, as described in detail in conjunction with FIG. 2, in some cloud-based embodiments the bridge devices 140, the bridge application 150, and the bridge connectors 160 may be omitted, and the charm application 130 may be modified accordingly.

Cloud-Based System Overview

Figure 2:
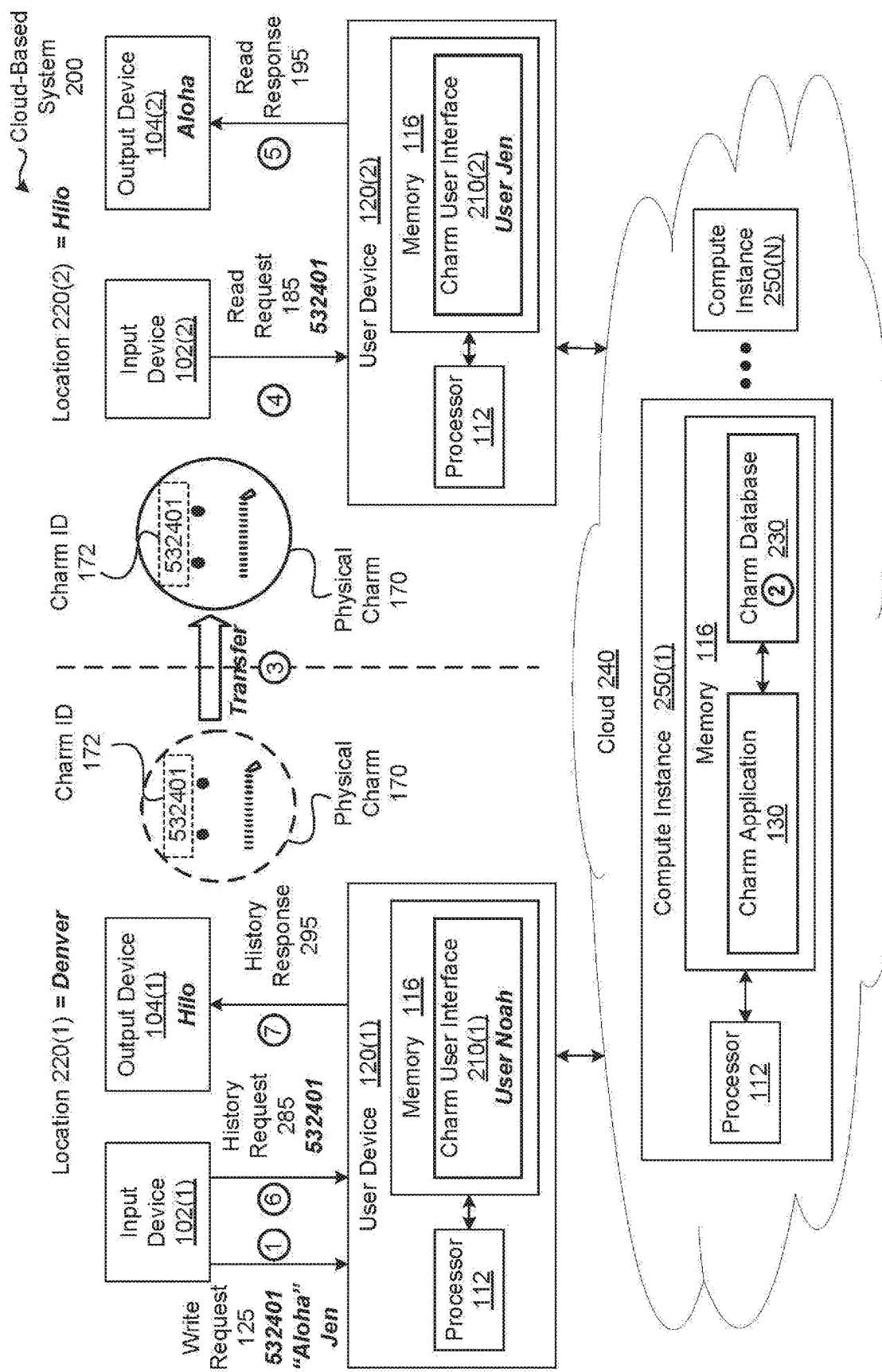
FIG. 2 is a conceptual illustration of a cloud-based system configured to implement one or more aspects of the present invention.

FIG. 2 is a conceptual illustration of a cloud-based system 200 configured to implement one or more aspects of the present invention. As shown, the cloud-based system 200 includes, without limitation, a cloud 240 (i.e., encapsulated shared resources, software, data, etc.), two user devices 120, two input devices 102, two output devices 104, and the physical charm 170. The cloud 240 includes, without limitation, any number of compute instances 250. Each of the compute instances 250 includes, without limitation, the processor 112 and the memory 116.

It will be appreciated that the cloud-based system 200 shown herein is illustrative and that variations and modifications are possible. The number of compute instances 250, the number of user devices 120, the number of input devices 102, the number of output devices 104, the number of physical charms 170, and the connection topology between the various units in system 100 may be modified as desired.

In alternate embodiments, any number of the compute instances 250 or elements included in the compute instances 250 (e.g., the processor 112, the memory 116, etc.) may be implemented within one or more devices that are not included in the cloud. For example, one of more of the compute instances 250 could be implemented within a laptop. In some embodiments, the cloud-based system 200 may include any number of the clouds 240. In various embodiments, the cloud 240 is replaced with a distributed computing system or a non-distributed computing system that is accessible to the user devices 120.

Each of the user devices 120 included in the cloud-based system 200 is capable of accessing the cloud 240 in any technically feasible fashion. For example, each of the user devices 120 could access the cloud 240 via the Internet. Importantly, however, transferring the physical charm 170 between users does not involve any technical infrastructure (e.g., the Internet). Further, the cloud-based system 200 does not necessarily include any bridge devices 140 or bridge connectors 160. To facilitate identification of the physical charm 170 without the bridge device 140, the surface of the physical charm 170 visibly depicts the charm ID 172. For example, the charm ID 172 could be stamped on the surface of the physical charm 170 or molded into the surface as part of the manufacturing process.

As shown, for each of the user devices 120, an instance of a charm user interface 210 resides in the memory 116 of the user device 120 and executes on the processor of the user devices 120. In a similar fashion, the charm application 130 resides in the memory 116 of the compute instance 250 and executes on the processor of the compute instance 250. In general, the charm user interface 210 receives requests associated with the physical charms 170 from users via the input devices 102, transmits the requests to the charm application 130, receives responses from the charm application 130, and provides the responses to users via the output devices 104.

Storing Messages in a Charm Database

The charm application 130 processes requests associated with the physical charms 170 that the charm application 130 receives from the charm user interface 210. As part of processing the requests, the charm application 130 interfaces with a charm database 230 that resides in the memory of the compute instance 250. In alternate embodiments, the charm database 230 may reside in any memory that is accessible to the charm application 130.

The charm database 230 is a centralized database that maintains charm configurations (not shown in FIG. 2) associated with the physical charms 170 included in the cloud-based system 200. As described in greater detail in conjunction with FIG. 3, the charm database 230 may include any number of charm configurations. Each charm configuration includes, without limitation, one of the charm IDs 172, a message, an authorization list, and a history. The history includes, without limitation, any number of timestamps and any number of locations 220. Each location 220 specifies a location at which the message associated with the physical charm 170 has been successfully accessed.

In alternate embodiments, the charm configuration and the history may include any amount and type of data associated with the physical charms 170. For example, the charm configuration could include a "write flag" that specifies whether users may change the message associated with the physical charm 170. In another example, the history could include user IDs associated with users that have successfully accessed the message associated with the physical charm 170.

In operation, upon receiving the write request 125 from a user via the input device 102, the charm user interface 210 transmits the write request 125 to the charm application 130. The write request 125 specifies the charm ID 172, a message, and an authorization list. In some embodiments, the authorization list defaults to all users. The charm application 130 determines whether the charm database 230 includes a charm configuration associated with the charm ID 172. If the charm database 230 does not include a charm configuration associated with the charm ID 172, then the charm application 130 generates a charm configuration associated with the charm ID 172 based on the write request 125. The charm application 130 then stores the charm configuration in the charm database 230. If, however, the charm database 230 includes a charm configuration associated with the charm ID 172, then the charm application 130 updates the charm configuration based on the write request 125.

Upon receiving the read request 185 specifying the charm ID 172 from a user via the input device 102, the charm user interface 210 associates the read request 185 with the user ID of the user. The charm user interface 210 then transmits the read request 185 to the charm application 130. The charm application 130 retrieves the charm configuration associated with the charm ID 172 from the charm database 230. The charm application 130 then determines whether the user is authorized to access the message included in the charm configuration based on the authorization list included in the charm configuration.

If the user is authorized to access the message, then the charm application 130 determines the timestamp and the location 220 associated with the read request 185. The charm application 130 may determine the timestamp and the location 220 in any technically feasible fashion. In alternate embodiments, the charm user interface 210 may determine the timestamp and location 220 and provide the timestamp and the location 220 to the charm application 130. The charm application 130 then updates the history included in the charm configuration to specify the timestamp and the location 220 associated with the read request 185.

Subsequently, the charm application 130 transmits the message to the charm user interface 210 as the read response 195. The charm user interface 210 then provides the message to the user. The charm user interface 210 may provide the message in any technically feasible fashion. For example, if the message includes audio data, then the charm user interface 210 may configure a speaker to playback the message. If, however, the user is not authorized to access the message, then the charm application 130 transmits the unsuccessful read response 195 to the charm user interface 210. The "unsuccessful" read response 195 indicates that the user is not permitted to access the message. The charm user interface 210 then provides the unsuccessful read response 195 to the user.

Upon receiving a history request 285 specifying the charm ID 172 from a user via the input device 102, the charm user interface 210 transmits the history request 285 to the charm application 130. The charm application 130 reads the charm configuration associated with the charm ID 172 from the charm database 230 and provides data included in the history to the charm user interface 210 as the history response 295. The charm user interface 210 then transmits the history response 295 to the user.

In some embodiments, the charm application 130 or the charm user interface 210 may perform any amount and type of operations on data included in the history to generate or modify the history response 295. For example, in some embodiments, the charm application 130 generates a map based on the locations 220 included in the history and provides the map as the history response 295. The charm user interface 210 then causes the output device to display the map. In this fashion, users can visually track the location 220 of the physical charm 170 as the physical charm 270 is transferred between any number of users.

For explanatory purposes only, FIG. 2 depicts a sequence of events involved in a communication between a user "Noah" and another user "Jen" using a series of numbered bubbles. FIG. 2 depicts an initial location 220(1) of the physical charm 170 as Denver. The processor 112 of the user device 120(1) is executing the charm user interface 210(1) associated with Noah.

First, as depicted with the bubble numbered 1, Noah issues the write request 125 via the input device 102(1). The write request 125 specifies the charm ID 172 532401, a message "Aloha" and a recipient list that includes a user ID associated with Jen. The charm user interface 210(1) receives the write request 125 and transmits the write request 125 to the charm application 130. The charm application 130 generates a charm configuration based on the charm ID, the message, and the recipient list specified in the write request 125. As depicted with the bubble numbered 2, the charm application 130 then stores the charm configuration in the charm database 230.

As depicted with the bubble numbered 3, Noah transfers the physical charm 170 to Jen. Jen then travels to the location 220(2) Hilo. Subsequently, as depicted with the bubble numbered 4, Jen issues the read request 185 via the input device 102(2). The read request 185 specifies the charm ID 172 532401 of the physical charm 170. The read request 185 is received by the charm user interface 210(2) associated with Jen that is executing on the processor 112 of the user device 120(2). The charm user interface 210(2) associates the read request 185 with the user ID associated with Jen and transmits the read request 185 to the charm application 130.

The charm application 130 identifies the charm configuration included in the charm database 230 that is associated with the charm ID 172. The charm application 130 then verifies that the user ID associated with Jen is included in the authorization list included in the identified charm configuration. Subsequently, the charm application 130 updates the history included in the identified charm configuration to specify a current time and the location 220(2) Hilo. The charm application 130 then transmits the message included in the identified charm configuration to the charm user interface 210 as the read response 195. Upon receiving the read response 195, as depicted with the bubble numbered 5, the charm user interface 210(2) causes the display device 104(2) to display the message "Aloha."

Subsequently, as depicted with the bubble numbered 6, Noah issues the history request 285 via the input device 102(1). The history request 285 specifies the charm ID 172 532401 of the physical charm 170. The charm user interface 210(1) receives the history request 285 and transmits the history request 285 to the charm application 130. The charm application 130 identifies the charm configuration included in the charm database 230 that is associated with the charm ID 172. The charm application 130 then transmits the history included in the identified charm configuration to the charm user interface 210(2) as the history response 295. In response, the charm user interface 210(2) causes the display device 104(1) to display the location 220(2) "Hilo." In this fashion, the physical charm 170 and the charm application 130 enable Noah to confirm that Jen has arrived in Hilo.

Advantageously, one user may transfer the physical charm 170 to another user via any number of intermediaries. The charm application 130 ensures that any of the intermediaries that are not included in the authorization list do not access the message. Consequently, the charm application 130 ensures that the privacy of the message is preserved. In various embodiments, after a user B receives the physical charm 170 directly or indirectly from a user A, user B may append a new message to the message, replace the message with a new message, or leave the message unchanged. Further, user B may modify the authorization list or leave the authorization list unchanged. Subsequently, user B may transfer the physical charm 170 directly or indirectly to a user C. In this fashion, the physical charm 170 may be transferred any number of times between any number of users.

It will be appreciated that the cloud-based system 200 shown herein is illustrative and that variations and modifications are possible. For example the functionality of the charm application 130 and the charm user interface 210 as described herein may be integrated into or distributed across any number of software applications (including one) and any number of components of the cloud-based system 200. In particular, one or more instances of the charm user interface 210 may execute on a distributed computer system or one of the compute instances 250 instead of the user devices 120.

Notably, in various embodiments, any amount of functionality described in conjunction with the cloud-based system 200 may be combined with and/or replace any amount of functionality described in conjunction with the system 100 in any technically feasible fashion. For instance, in some alternate embodiments of the system 100, the bridge application 150 may store locations in the embedded memory 174. Similarly, in various embodiments, any amount of functionality described in conjunction with the system 100 may be combined with and/or replace any amount of functionality described in conjunction with the cloud based system 200 in any technically feasible fashion.

For instance, some alternate embodiments of the cloud-based system 200 include the bridge devices 140 and the bridge connectors 160, but the physical charm 170 includes neither read-write memory nor a visible charm ID 172. In such embodiments, the functionality of the bridge application 150 is limited to providing the charm ID 172 to the charm user interface 210. More precisely, when the user device 120 is connected with the physical charm 170 via the bridge device 140, the bridge application 150 determines the charm ID 172 electronically and provides the charm ID 172 to the charm user interface 210 and/or the charm application 130.

Figure 3:
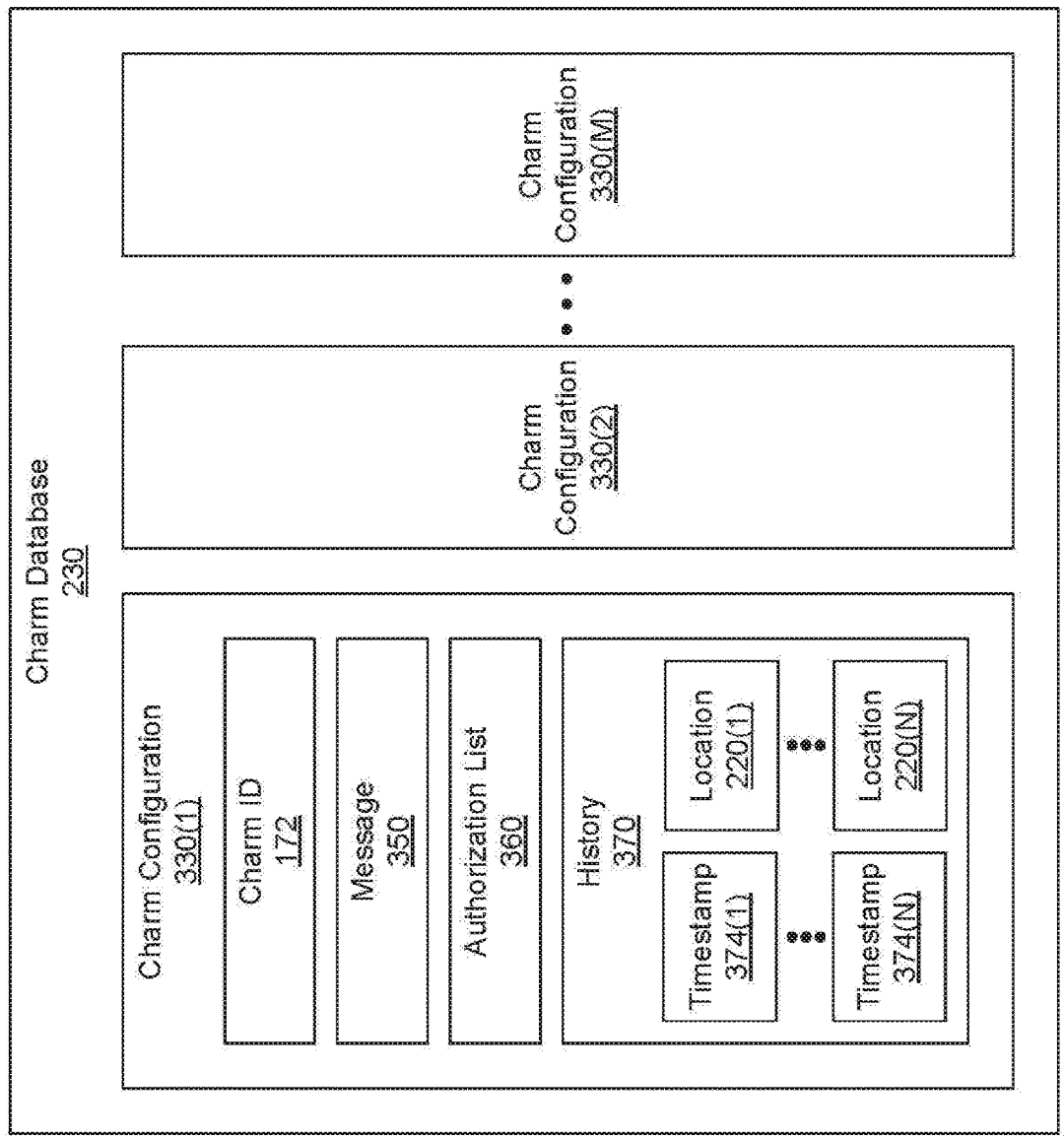
FIG. 3 is a more detailed illustration of the charm database of FIG. 2, according to various embodiments of the present invention.

FIG. 3 is a more detailed illustration of the charm database 230 of FIG. 2, according to various embodiments of the present invention. As shown, the charm database 230 includes, without limitation, any number of charm configurations 330. Each of the charm configurations 330 includes, without limitation, the charm ID 172, a message 350, an authorization list 360, and a history 370.

The charm ID 172 identifies one of the physical charms 170. The message 350 include any amount and type(s) of data associated with the physical charm 170 specified by the charm ID 172. For example, a particular message 350 could include text data, graphical data, haptic data, audio data, and video data. The authorization list 360 identifies any number of users that are authorized to retrieve the message 350. The authorization list 360 may identify the authorized users in any technically feasible fashion. For instance, in some embodiments, the authorization list 360 includes any number of user IDs. In some embodiments, the authorization list 360 may indicate that all users are authorized to retrieve the message 350.

The history 370 includes data associated with the read requests 185 that successfully retrieved the message 350. More precisely, the history 270 includes, for each successful read request 185, a timestamp 374 and the location 220. Accordingly, the number of locations 220 included in the history 370 is equal to the number of timestamps 374 included in the history 370. In alternate embodiments, the history 370 may include any amount and type of data. For instance, in some embodiments, the history 370 may include the user IDs and locations 220 associated with write requests 125, unsuccessful read requests 185, successful read requests 185, and history requests 285.

In alternate embodiments, the charm database 230 and the charm configurations 330 may include any amount and type of data relevant to the charms 270 in any technically feasible fashion instead of or in addition to the charm ID 172, the message 350, the authorization list 360, and the history 370. For example, each of the charm configurations 330 could also include a write authorization list that specifies user IDs of users that are authorized to create, append to, or replace the message 370.

Figure 4:
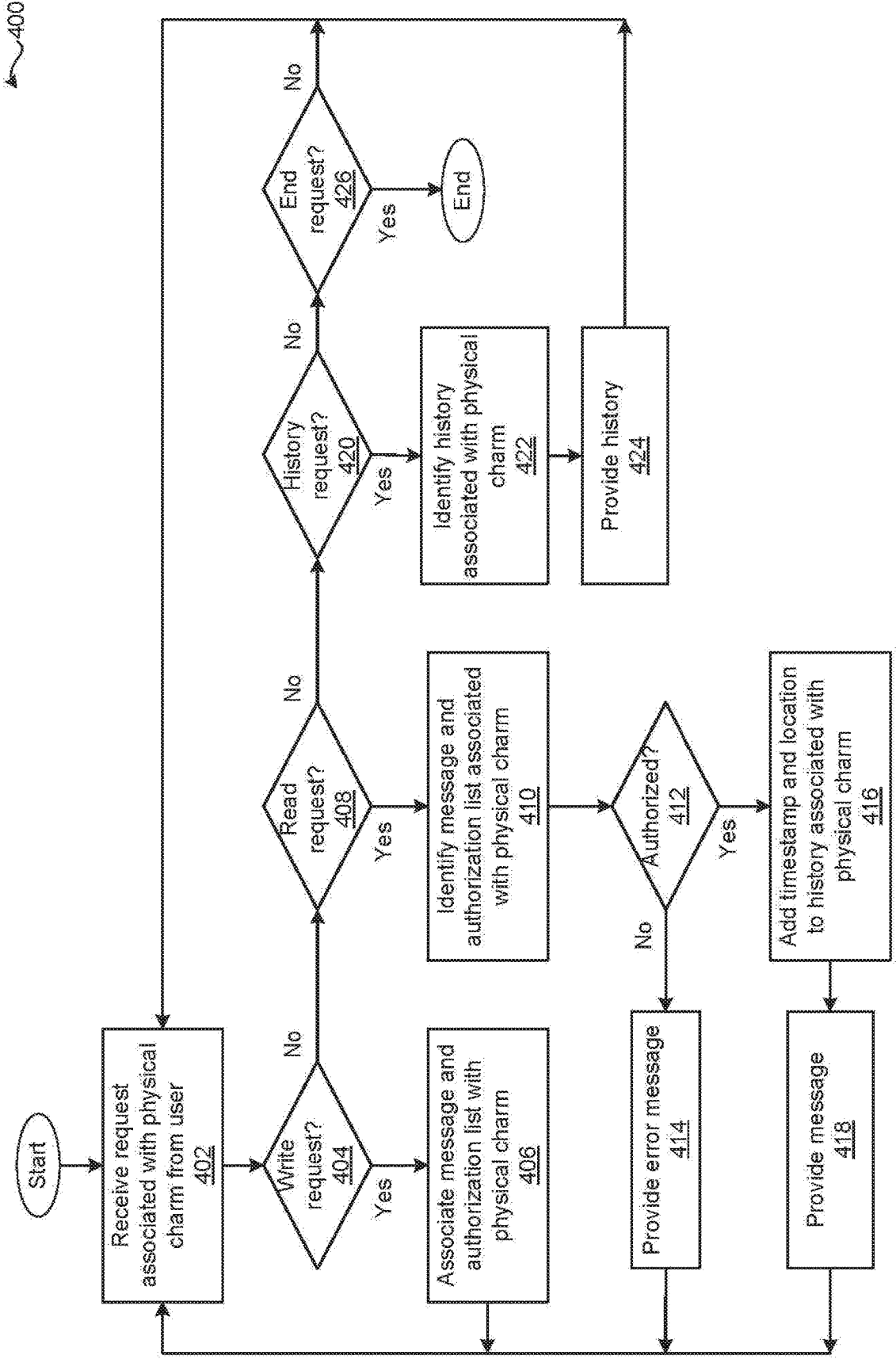
FIG. 4 is a flow diagram of method steps for communicating via a physical charm, according to various embodiments of the present invention.

FIG. 4 is a flow diagram of method steps for communicating via a physical charm, according to various embodiments of the present invention. Although the method steps are described with reference to the systems of FIGS. 1-3, persons skilled in the art will understand that any system configured to implement the method steps, in any order, falls within the scope of the present invention. In particular, in some embodiments, the system 100 is configured to implement the method steps. In some other embodiments, the cloud-based system 200 is configured to implement the method steps.

As shown, a method 400 begins at step 402, where the charm application 130 receives a request associated with the physical charm 270 and a user. The charm application 130 may receive the request directly from the user via an input device 102 or indirectly (e.g., from the charm user interface 210). At step 404, the charm application 130 determines whether the request is the write request 125. If, at step 404, the charm application 130 determines that the request is the write request 125, then the method 400 proceeds to step 406.

At step 406, the charm application 130 associates the message 350 specified in the write request 125 and the authorization list 360 specified in the write request with the physical charm 270. As a general matter, the charm application 130 may associate the message 350 and the authorization list 360 with the physical charm 270 in any technically feasible fashion.

For instance, in embodiments in which the charm application 130 is operating in the system 100, the charm application 130 may cause the bridge application 150 to store the message 350 and the authorization list 360 in the embedded memory 174 of the physical charm 170. In embodiments in which the charm application 130 is operating in the cloud-based system 100, the charm application 130 may generate a new charm configuration 330 that specifies the charm ID 172 of the charm 170, the message 350, and the authorization list 360. The charm application 130 may then store the new charm configuration 330 in the charm database 230. After the charm application 130 associates the message 350 and the authorization list 360 with the physical charm 270, the method 400 returns to step 402, where the charm application 130 receives a new request associated with the physical charm 170.

If, however, at step 404, the charm application 130 determines that the request is not the write request 125, then the method 400 proceeds directly to step 408. At step 408, the charm application 130 determines whether the request is the read request 185. If, at step 408, the charm application 130 determines that the request is the read request 185, then the method 400 proceeds to step 410.

At step 410, the charm application 130 identifies the message 350 and the authorization list 360 that are associated with the charm 170. As a general matter, the charm application 130 may identify the message 350 and the authorization list 360 that are associated with the physical charm 270 in any technically feasible fashion.

For instance, in embodiments in which the charm application 130 is operating in the system 100, the charm application 130 may cause the bridge application 150 to read the message 350 and the authorization list 360 stored in the embedded memory 174 of the physical charm 170. In embodiments in which the charm application 130 is operating in the cloud-based system 100, the charm application 130 may identify one of the charm configurations 330 included in the charm database 230 based on the charm ID 172 of the charm 170. The identified charm configuration 330 includes the message 350 and the authorization list 360 that are associated with the charm 170.

At step 412, the charm application 130 determines whether the user from which the read request 185 was received is authorized to access the message 350 included in the identified charm configuration 330. The charm application 130 may determine whether the user is authorized to access the message 350 in any technically feasible fashion. For example, the charm application 130 could compare the user ID associated with the user to the user IDs specified in the authorization list 360 included in the identified charm configuration 330. If the user ID associated with the user matches one of the user IDs specified in the authorization list 360, then the charm application 130 determines that the user is authorized to access the message 350.

If, at step 412, the charm application 130 determines that the user from which the read request 185 was received is not authorized to access the message 350 included in the identified charm configuration 330, then the method 400 proceeds to step 414. At step 414, the charm application 130 causes an error message indicating that the user is not authorized to access the message 350 to be provided to the user. The method 400 then returns to step 402, where the charm application 130 receives another request.

If, however, at step 412, the charm application 130 determines that the user from which the read request 185 was received is authorized to access the message 350 included in the identified charm configuration 330, then the method 400 proceeds directly to step 416. At step 416, the charm application 130 includes the timestamp 374 and the location 220 associated with the read request 185 in the history 370 included in the identified charm configuration 330. At step 418, the charm application 130 causes the message 350 included in the identified charm configuration 330 to be provided to the user. The method 400 then returns to step 402, where the charm application 130 receives a new request.

If, however, at step 408, the charm application 130 determines that the request is not the read request 185, then the method 400 proceeds directly to step 420. At step 420, the charm application 130 determines whether the request is the history request 285. If, at step 420, the charm application 130 determines that the request is the history request 285, then the method 400 proceeds to step 422. At step 422, the charm application 130 identifies the history 370 that is associated with the charm 170 based on the charm ID 172 associated with the charm 170 and the charm database 230.

At step 424, the charm application 130 causes at least a portion of the identified history 370 to be provided to the use. For instance, the charm application 130 could cause a map of the locations 220 included in the history 370 to be displayed to the user via the display device 104 associated with the user device 120. The method 400 then returns to step 402, where the charm application 130 receives a new request.

If, however, at step 420, the charm application 130 determines that the request is not the history request 285, then the method 400 proceeds directly to step 426. At step 426, the charm application 130 determines whether the request is an end request. If, at step 426, the charm application 130 determines that the request is not an end request, then the method 400 returns to step 402, where the charm application 130 receives a new request. If, however, at step 426, the charm application 130 determines that the request is an end request, then the method 400 terminates.

In sum, the disclosed techniques may be implemented to enable users to communicate with other users via physical charms. A user that is in possession of a physical charm executes a charm application to associate the physical charm with a message and an authorization list that specifies one or more authorized users. Subsequently, the physical charm may be exchanged between any number of users. If a particular user is included in the authorization list, then the user may execute the charm application to access the message. If, however, the user is not included in the authorization list, then the user is unable to access the message.

Advantageously, because the physical charms may be passed between users, the users may effectively communicate with other users without a technical infrastructure. Further, the charm application allows any type of data to be privately communicated via the charms. By contrast, conventional techniques for communicating without a technical infrastructure, such as passing notes, allow only limited types of data to be communicated and/or are unable to ensure the privacy of the data. Yet another advantage of communicating via charms is that the form of the physical charm may convey additional, public information.

1. In some embodiments, a method for communicating via a physical charm comprises receiving, from a first user device associated with a first user, a first read request associated with a first physical charm; in response to receiving the first read request, identifying a message and an authorization list that are associated with the first physical charm and previously received from a second user device; determining that the first user is authorized to read the message based on the authorization list; and transmitting the message to the first user device.

2. The method of clause 1, wherein identifying the message and the authorization list comprises determining a charm identifier associated with the first physical charm based on input received via the first user device; and performing one or more read operations with respect to a first memory based on the charm identifier, wherein the first memory stores data associated with one or more charm identifiers.

3. The method of clauses 1 or 2, wherein the first memory is accessible via the Internet.

4. The method of any of clauses 1-3, wherein identifying the message and the authorization list comprises performing one or more read operations with respect to a first memory included in the first physical charm, wherein the first memory stores data associated with the first physical charm.

5. The method of any of clauses 1-4, wherein the message includes at least one of text data, graphical data, haptic data, or audio data.

6. The method of any of clauses 1-5, further comprising adding a location associated with the first read request to a history associated with the first physical charm; and causing the history to be provided to the second user device.

7. The method of any of clauses 1-6, wherein determining that the first user is authorized to read the message comprises determining that a user identification associated with the first user is included in the authorization list.

8. The method of any of clauses 1-7, further comprising receiving, from a third user device associated with a second user, a second read request associated with the first physical charm; in response to receiving the second read request, determining that the second user is not authorized to read the message based on the authorization list; and transmitting an error message to the third user device, wherein the error message indicates that the second user is not authorized to read the message.

9. In some embodiments, a computer-readable storage medium includes instructions that, when executed by a processor, cause the processor to perform the steps receiving, from a first user device associated with a first user, a first read request associated with a first physical charm; in response to receiving the first read request, identifying a message and an authorization list that are associated with the first physical charm and previously received from a second user device; determining that the first user is authorized to read the message based on the authorization list; and transmitting the message to the first user device.

10. The computer-readable storage medium of clause 9, wherein identifying the message and the authorization list comprises performing one or more electronic operations on the physical charm to determine a charm identifier; and performing one or more read operations with respect to a first memory based on the charm identifier, wherein the first memory stores data associated with one or more charm identifiers.

11. The computer-readable storage medium of clauses 9 or 10, wherein the first memory is accessible via the Internet.

12. The computer-readable storage medium of any of clauses 10-11, wherein identifying the message and the authorization list comprises performing one or more read operations with respect to a first memory included in the first physical charm, wherein the first memory stores data associated with the first physical charm.

13. The computer-readable storage medium of any of clauses 10-12, wherein the message includes at least one of text data, graphical data, haptic data, or audio data.

14. The computer-readable storage medium of any of clauses 10-13, further comprising adding a location associated with the first read request to a history associated with the first physical charm; and causing the history to be provided to the second user device.

15. The computer-readable storage medium of any of clauses 10-14, further comprising generating a map based on the history, and causing the history to be provided to the second user device comprises transmitting the map to the second user device.

16. The computer-readable storage medium of any of clauses 10-15, further comprising, prior to receiving the first read request, storing the message and the authorization list in at least one of a first memory included in the first physical charm and a second memory accessible via the Internet.

17. In some embodiments, a system for communicating via a physical charm comprises a memory storing a charm application; and a processor coupled to the memory, wherein when executed by the processor, the charm application configures the processor to receive, from a first user device associated with a first user, a first read request associated with a first physical charm; in response to receiving the first read request, identify a message and an authorization list that are associated with the first physical charm and previously received from a second user device; determine that the first user is authorized to read the message based on the authorization list; and transmit the message to the first user device.

18. The system of clause 17, wherein the charm application configures the processor to receive the first read request by obtaining input from the first user via at least one of a microphone, a keyboard, a mouse, and a touchscreen associated with the first user device.

19. The system of clauses 17 or 18, wherein the charm application configures the processor to transmit the message to the first user device by providing the message to a speaker, a display, or a touchscreen associated with the first user device.

20. The system of any of clauses 17-19 wherein the processor is associated with a cloud, the charm application configures the processor to receive the first read request by obtaining the read request from a user interface associated with the first user device, and the charm application configures the processor to transmit the message to the first user device by relaying the message to a user interface associated with the first user device.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for communicating via a physical charm, the method comprising:
   receiving, by a first device from a first user device associated with a first user, a first request to read a first physical charm, wherein the first request specifies a first charm identifier associated with the first physical charm, wherein the first device comprises a bridge device that is separate from the first user device, and wherein the first physical charm comprises a physical object;
   in response to receiving the first request, determining, by the first device, that a connection from the first device to the first physical charm currently exists based on the first charm identifier;
   in response to determining that a connection from the first device to the first physical charm currently exists, reading, by the first device, a message and an authorization list that are stored in a memory included in the first physical charm, both the message and the authorization list having been written to the memory via a second user device associated with a second user, wherein the message and the first charm identifier are stored separately from one another in the memory;
   determining that the first user is authorized to read the message based on the authorization list; and
   transmitting the message to the first user device.

2. The computer-implemented method of claim 1, wherein reading the message and the authorization list comprises performing one or more read operations with respect to the memory, and wherein the memory stores data associated with the first physical charm.

3. The computer-implemented method of claim 1, wherein the message includes at least one of text data, graphical data, haptic data, or audio data.

4. The computer-implemented method of claim 1, further comprising:
   adding a location associated with the first request to a history associated with the first physical charm; and
   causing the history to be provided to the second user device.

5. The computer-implemented method of claim 1, wherein the message, the authorization list, and the first charm identifier are stored separately from one another in the memory, wherein the authorization list includes one or more identifiers associated with one or more users that are authorized to read the message from the memory, and wherein determining that the first user is authorized to read the message comprises determining that a user identification associated with the first user is included in the authorization list.

6. The computer-implemented method of claim 1, further comprising:
   receiving, from a third user device associated with a third user, a second request associated with the first physical charm;
   in response to receiving the second request, determining that the third user is not authorized to read the message based on the authorization list; and
   transmitting an error message to the third user device, wherein the error message indicates that the third user is not authorized to read the message.

7. The computer-implemented method of claim 1, wherein the first request specifying the first charm identifier is received via a first graphical user interface associated with the first user device.

8. One or more non-transitory computer-readable storage media including instructions that, when executed by one or more processors, cause the one or more processors to perform the steps of:
   receiving, by a first device from a first user device associated with a first user, a first request to read a first physical charm, wherein the first request specifies a first charm identifier associated with the first physical charm, wherein the first device comprises a bridge device that is separate from the first user device, and wherein the first physical charm comprises a physical object;
   in response to receiving the first request, determining, by the first device, that a connection from the first device to the first physical charm currently exists based on the first charm identifier;
   in response to determining that a connection from the first device to the first physical charm currently exists, reading, by the first device, a message and an authorization list that are stored in a memory included in the first physical charm, both the message and the authorization list having been written to the memory via a second user device associated with a second user, wherein the message and the first charm identifier are stored separately from one another in the memory;
   determining that the first user is authorized to read the message based on the authorization list; and
   transmitting the message to the first user device.

9. The one or more non-transitory computer-readable storage media of claim 8, wherein reading the message and the authorization list comprises performing one or more read operations with respect to the memory, and wherein the memory stores data associated with the first physical charm.

10. The one or more non-transitory computer-readable storage media of claim 8, wherein the message includes at least one of text data, graphical data, haptic data, or audio data.

11. The one or more non-transitory computer-readable storage media of claim 8, the steps further comprising:
    adding a location associated with the first request to a history associated with the first physical charm; and
    causing the history to be provided to the second user device.

12. The one or more non-transitory computer-readable storage media of claim 11, the steps further comprising generating a map based on the history, wherein causing the history to be provided to the second user device comprises transmitting the map to the second user device.

13. A system for communicating via a physical charm, the system comprising:
    one or more memories storing a software application; and
    one or more processors coupled to the one or more memories, wherein when executed by the one or more processors, the software application configures the one or more processors to:
    receive, by a first device from a first user device associated with a first user, a first request to read a first physical charm, wherein the first request specifies a first charm identifier associated with the first physical charm, wherein the first device comprises a bridge device that is separate from the first user device, and wherein the first physical charm comprises a physical object, in response to receiving the first request, determine, by the first device, that a connection from the first device to the first physical charm currently exists based on the first charm identifier, in response to determining that a connection from the first device to the first physical charm currently exists, read, by the first device, a message and an authorization list that are stored in a second memory included in the first physical charm, both the message and the authorization list having been written to the second memory via the first user device associated with the first user, wherein the message and the first charm identifier are stored separately from one another in the second memory, determine that a second user associated with the system is authorized to read the message based on the authorization list, and output the message via an output device.

14. The system of claim 13, wherein the software application configures the one or more processors to receive the first request by obtaining input from the second user via at least one of a microphone, a keyboard, a mouse, or a touchscreen associated with the system.

15. The system of claim 13, wherein the software application configures the one or more processors to output the message by providing the message to a speaker, a display, or a touchscreen.

* * * * *